July 7, 1931. A. STOCKSTROM Des. Re. 18,121

RANGE OR SIMILAR ARTICLE

Original Filed Aug. 25, 1930

Inventor

A. Stockstrom

By Pattison, Wright & Pattison

Attorneys

Reissued July 7, 1931

Des. Re. 18,121

UNITED STATES PATENT OFFICE

ARTHUR STOCKSTROM, OF ST. LOUIS, MISSOURI, ASSIGNOR TO AMERICAN STOVE COMPANY, OF ST. LOUIS, MISSOURI, A CORPORATION OF NEW JERSEY

DESIGN FOR A RANGE OR SIMILAR ARTICLE

Original No. 82,528, dated November 11, 1930, Serial No. 36,762, filed August 25, 1930. Application for reissue filed February 3, 1931. Serial No. 38,534. Term of patent 14 years.

*To all whom it may concern:*

Be it known that I, ARTHUR STOCKSTROM, a citizen of the United States, residing in the city of St. Louis and State of Missouri, have invented a new, original, and ornamental Design for a Range or Similar Article, of which the following is a specification, reference being had therein to the accompanying drawings.

Figure 1:
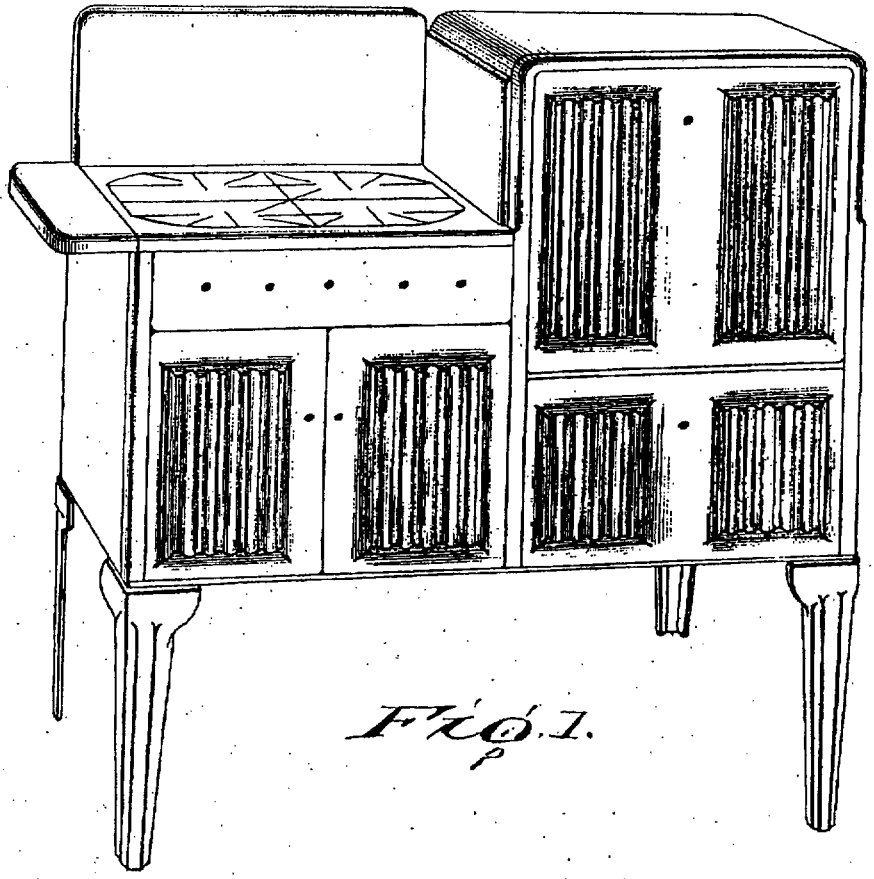
Figure 1 is a perspective view of my new design for a range the same being shown in open position.
Figure 2:
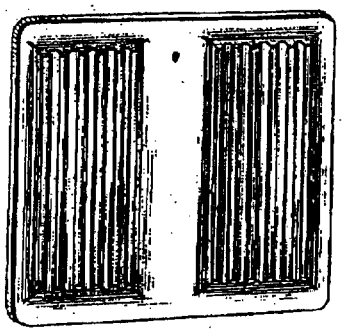
Fig. 2 is a perspective view showing the range door thereof.

The dominant feature of my design is a fluted door or panel for gas ranges and the like.

I claim:

The ornamental design for a range or similar article, as shown and described.

ARTHUR STOCKSTROM.